UNITED STATES PATENT OFFICE.

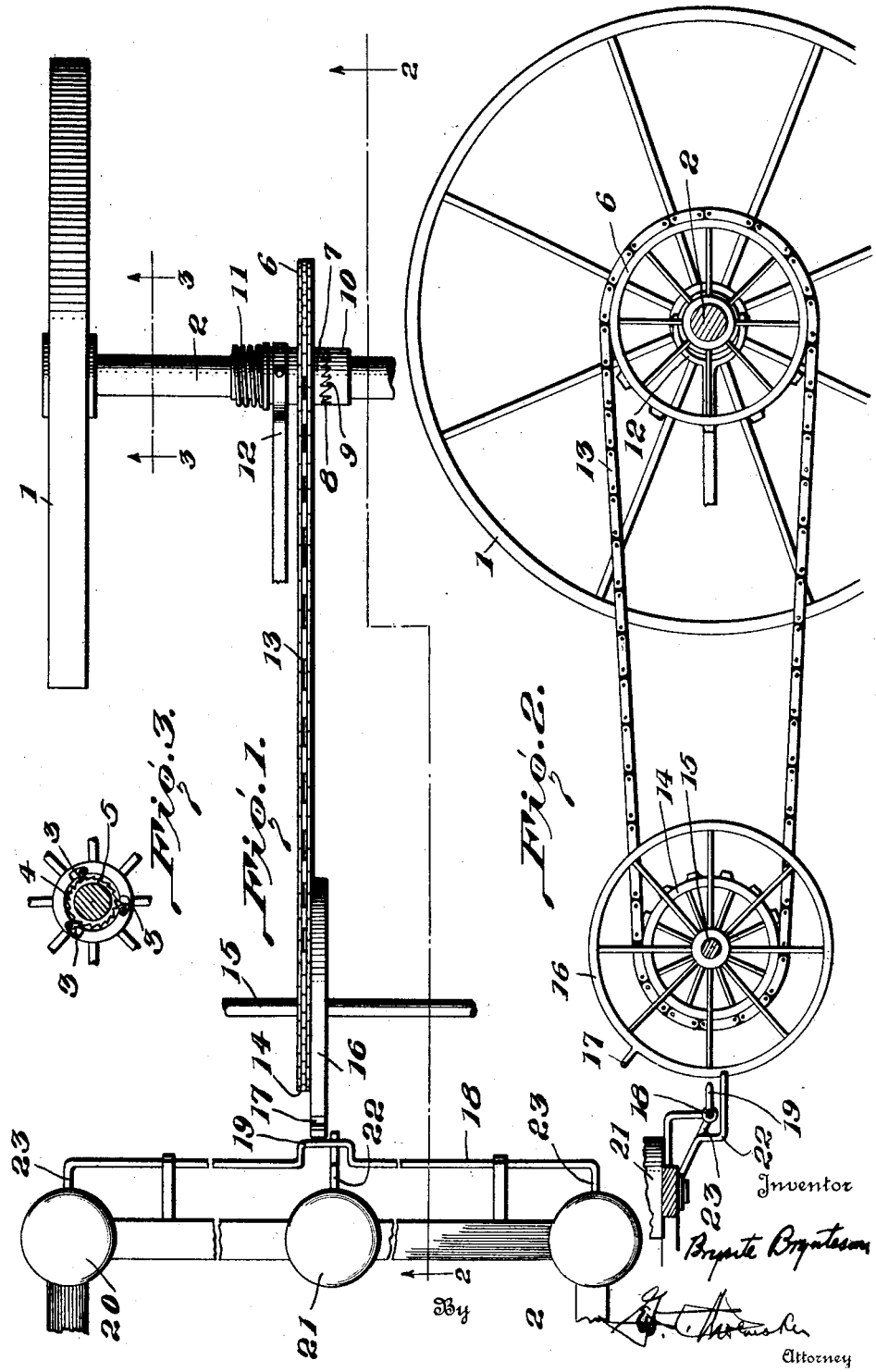

BRYNTE BRYNTESON, OF ODEBOLT, IOWA.

WIRELESS CORN-PLANTER.

1,396,093. Specification of Letters Patent. Patented Nov. 8, 1921.

Application filed April 8, 1921. Serial No. 459,590.

*To all whom it may concern:*

Be it known that I, BRYNTE BRYNTESON, a citizen of the United States, residing at Odebolt, in the county of Sac and State of Iowa, have invented new and useful Improvements in Wireless Corn-Planters, of which the following is a specification.

The invention relates to a wireless corn planter.

The object of the present invention is to provide a simple practical and efficient construction adapted to be readily applied to corn planters for enabling the planting to be effected without the use of wires or the like and equipped with means for operating the said dropping devices and also the means for operating a lime or chalk dropping mechanism for marking the place where planting starts or stops.

It is also an object of the invention to provide a mechanism of this character adapted to be applied to planters with very little change of the construction of the same.

With these and other objects in view the invention consists in the novel construction, combination and arrangement of parts hereinafter fully described, illustrated in the accompanying drawing and pointed out in the claim hereto appended, it being understood that various changes in the form, proportion and minor details of construction, within the scope of the claim, may be resorted to without departing from the spirit or sacrificing any of the advantages of the invention.

In the drawing in which like characters of reference designate corresponding parts in the several figures, Figure 1 is a perspective view of a portion of a wireless corn planter illustrating planting mechanism constructed in accordance with this invention.

Fig. 2 is a detail view of the mechanism for throwing the planting mechanism into and out of operation.

Fig. 3 is a detail sectional view on the line 3—3 of Fig. 1.

In the accompanying drawing the wireless corn planter comprises in its construction a traction or carrying wheel 1 mounted on an axle 2 and connected therewith by clutch mechanism consisting of dogs 3 mounted on the axle and arranged to engage ratchet or clutch teeth 4 of the hub 5 of the wheel 1 and adapted to permit the wheel to rotate backwardly without operating the planting mechanism hereinafter described. When the wheel 1 rotates forwardly, the ratchet or clutch teeth 4 are engaged by the dogs 3 and the axle 2 is rotated and when the wheel 1 rotates in the opposite direction in the backing of the corn planter, the dogs are lifted off the clutch or ratchet teeth 4 and the axle will not be rotated by the wheel 1.

Mounted on the axle is a sprocket wheel 6 provided at its hub 7 with a clutch face 8 adapted to interlock with a corresponding clutch face 9 of a clutch member 10 fixed to the axle 2. The clutch faces 8 and 9 are preferably recessed or toothed and are maintained in engagement by a coiled spring 11 mounted on the axle 2 and engaging the hub 7 at the outer end thereof, the clutch being arranged at the inner end of the hub but any other desired arrangement may, of course, be employed. The sprocket wheel is adapted to be maintained out of engagement with the relatively fixed clutch member 10 by shifting of the clutch lever 12 which may be mounted in any desired manner and which will enable the planting mechanism to be thrown out of operation while turning the machine at the end of a row or when moving the machine from one field or place to another and it is desired not to operate the planting mechanism.

The sprocket wheel 6 receives a sprocket chain 13 which is also arranged on a sprocket pinion or wheel 14 mounted on a shaft 15 located in advance of the axle 2 and arranged adjacent the said dropping mechanism. A wheel 16 which is suitably fixed to the sprocket wheel or pinion 14 is provided with a peripheral tooth 17. The rod or rock shaft 18 which is mounted in suitable bearings is provided intermediate its ends with a projecting loop 19 arranged in the path of the projection or tooth 17 of the wheel 16 so that at each revolution of the wheel 16 the rod 18 will be rocked and the said dropping mechanism operated. The diameters of the sprocket wheels may be varied to effect the dropping of the feed at the desired intervals.

The said dropping mechanism preferably comprises seed boxes or hoppers 20, located at opposite sides of the corn planter at the front thereof and suitable seed dropping devices (not shown) of any desired construction, adapted to be operated by the rocking or partial rotary movement of the shaft or rod 18. The shaft or rod 18 is also adapted to operate a suitable dropping device of a lime or chalk box or hopper 21 preferably arranged adjacent to the projecting loop or arm of the rod or shaft 18 and having a lever 22 adapted to be operated by the said rod or shaft. The terminals 23 of the rod or shaft are preferably extended to form rods for operating the said dropping devices of the boxes or hoppers 20. The lever 22 of the chalk or lime dropping device may be arranged for automatic operation by the rod or shaft 18 or it may be operated only when desired by providing suitable means for maintaining the lever out of or beyond the point of movement of the rod or shaft 18. As many planters are equipped with wheels similar to the wheel 1 it will be apparent that the mechanism herein shown and described may be readily applied to such planters with very little change in the construction of the same.

What is claimed is:

A wireless corn planter including a rear sprocket wheel designed to be mounted on the axle of a machine, a front sprocket wheel connected with and actuated by the rear sprocket wheel, a rotary element connected with and actuated by the front sprocket wheel and provided with a projecting tooth, feed boxes having dropping devices in the bottom thereof, a shaft or rod connected with said dropping devices, the shaft or rod being provided at a point opposite the rotary element with a loop, a lime or chalk box located between the feed boxes, a dropping device for said box having a lever extending beneath the loop of the shaft or rod and means for causing the projecting tooth of the rotary element to depress the loop and lever for operating the dropping devices.

In testimony whereof I have hereunto set my hand.

BRYNTE BRYNTESON.